Sept. 29, 1970

J. B. RUST 3,531,281

PHOTOPOLYMER FIXATION PROCESS

Filed Oct. 3, 1966

INVENTOR.
John B. Rust,
BY
ATTORNEY.

INVENTOR.
John B. Rust
BY
ATTORNEY.

United States Patent Office 3,531,281
Patented Sept. 29, 1970

3,531,281
PHOTOPOLYMER FIXATION PROCESS
John B. Rust, Los Angeles, Calif., assignor to Hughes Aircraft Company, Culver City, Calif., a corporation of Delaware
Filed Oct. 3, 1966, Ser. No. 583,649
Int. Cl. G03c 5/24, 1/68
U.S. Cl. 96—48
35 Claims

ABSTRACT OF THE DISCLOSURE

Fixation process for a polymerization effecting photo-oxidant and catalyst system contained in a photopolymerizable monomer system, compositions therefor and products, utilizing a silver compound as the fixing agent of said catalyst system after activation thereof.

---

Figure 1:
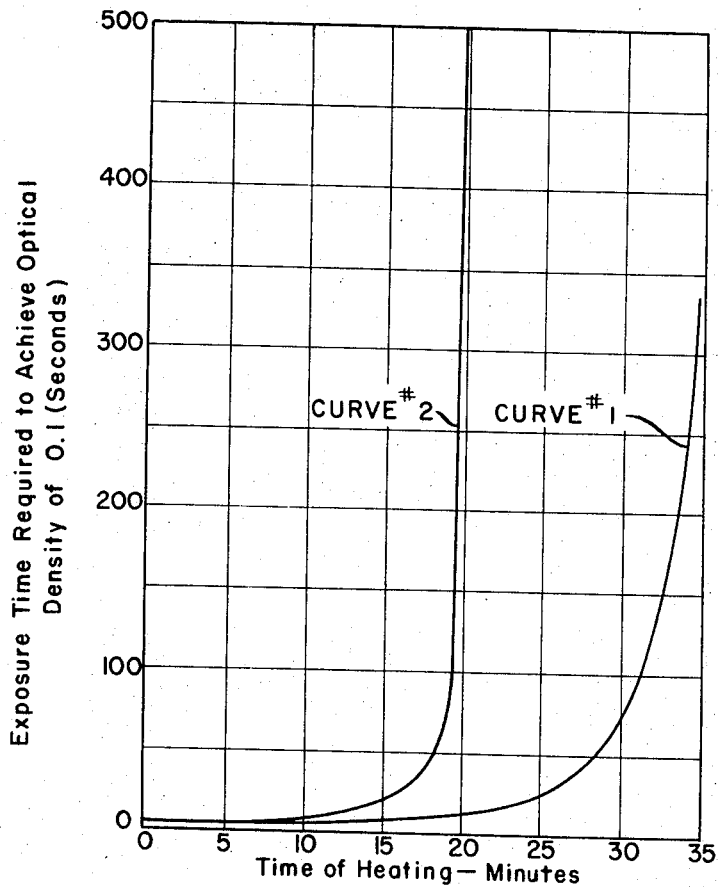

The present invention relates to the fixing, inactivating or desensitization of photopolymerizable compositions, and more particularly to fast fixing of partially polymerized photopolymerizable compositions with the addition of a soluble silver compound while employing a latent catalyst as in photo-redox catalyst systems for the initiation of polymerization upon the absorption of radiant energy, and the products obtained therewith and thereby.

In the copending application Ser. No. 583,649 filed currently herewith of Leroy J. Miller and John B. Rust entitled "Photopolymer Polymerization Fixation Process and Products" and assigned to the instant assignee (hereafter referred to as the "said copending application"), there was disclosed a novel method for rapidly fixing or desensitizing a photosensitive composition comprising in combination: (1) a polymerizable monomer; (2) a pH-lowering agent; and (3) a latent catalyst system as exemplified by a photo-redox catalyst system consisting of (a) a photo-oxidant capable of being raised to a photoactive level by absorbing light lying in the wavelength region between about 3800 A. and about 7200 A. and, at such photoactive level, capable of reacting with (b) a catalyst by accepting an electron therefrom to thereby produce a polymerization initiating free radical.

The term "photo-redox catalyst system" as used in said copending application designated a catalyst system employing organic sulfinic compounds and triorgano-substituted phosphines as catalysts. However, the term "photo-redox catalyst system," as used herein, will refer to photo-redox catalyst systems employing, as catalyst, only the organic sulfinic compounds of said copending application. The terms "photosensitive composition" or "light sensitive composition" will herein be used to designate the photosensitive compositions of said copending application, as previously described, with the hereinbefore described limitation on the catalyst. The subject matter of said copending application is incorporated herein by reference.

The present invention relates to an improvement in the rate of fixing, deactivating or desensitization of photosensitive compositions containing a polymerizable monomer and and a latent polymerization catalyst, as a photo-redox catalyst system, after initial exposure and partial polymerization, to prevent any further photo-polymerization upon additional exposure to visible light.

In general, upon exposure of a polymerizable medium containing a light sensitive photopolymer composition, as disclosed in said copending application, to light received from an object, some of the light sensitive photopolymer composition immediately commences to polymerize, in accordance with the radiation received, thereby producing a faithful image reproduction of the subject. To prevent further polymerization, after the image has been formed to the desired density, the polymerizable monomer or the photo-redox catalyst system which remains in the medium must be immediately fixed, desensitized or inactivated. If this is not accomplished, the polymerizable monomer will continue to polymerize when further irradiated by radiation within the 3800 to 7200 A. range. Such continued polymerization may degrade the image by making the photopolymer image indistinguishable from the background. For these reasons, fast fixation, deactivation or desensitization of the light sensitive polymerizable composition must occur as quickly as possible after image formation to a desired density has been achieved, if the high quality image is to be retained.

Heretofore fixing, inactivation or desensitization of the light sensitive photopolymer compositions was obtained by removal of monomer or catalyst therefrom, as by dissolution of the monomer with a solvent, leaving the polymerized image intact. Such extraneous "fixing" means do not lend themselves to ultrarapid processing and require additional careful handling and extra equipment for the containment of the extraneous agent.

In said copending application, a fixing or desensitization process is described which relies solely on careful control of a relatively critical pH and increase in temperature of the partially polymerized photosensitive composition. As described therein, the fixation and desensitization rate is increased by the combination of decreasing the pH of the photosensitive composition below about pH 7 and heating such composition at temperatures above the normal room temperature or temperature of initiating polymerization. The process of said copending application thus avoids the disadvantages of the prior art as previously described while providing rapid fixation or desensitization. However, fixation or desensitization by the process of said copending application may sometimes still not be sufficiently rapid to satisfy the requirements of a photopolymerization process employing a particular photosensitive composition. Therefore, it would be advantageous to have a fixing, deactivating or desensitization process which avoids the prior art disadvantages and, additionally, further substantially reduces the time required for complete fixation or desensitization of the partially polymerized polymer system.

Bearing in mind the foregoing, it is a major object of the present invention to provide a method and means for rapidly and efficiently fixing, inactivating or desensitizing light sensitive polymerizable compositions employing a photo-redox catalyst system, wherein the catalyst is an organic sulfinic compound, without physical removal of the photo-redox catalyst system and/or unreacted monomer, while simultaneously enabling the light sensitive photopolymer composition to be polymerized substantially as rapidly as it would be without inclusion of such fixing, inactivating or desensitizing means.

It is a further object of this invention to provide a process for fixing, inactivating or desensitizing light sensitive photopolymer compositions, particularly light sensitive photopolymer compositions employing a photo-redox catalyst system comprising a photo-oxidant and organic sulfinic compounds, as disclosed in said copending application, wherein said light sensitive photopolymer composition is rendered insensitive to visible light, after initial exposure, without the use of extraneous chemical reagents in additional processing steps or the use of "fixing" baths.

An additional object of this invention is to provide a process for fixing, inactivating or desensitization of normally light sensitive photopolymer compositions containing a photo-redox catalyst system employing an organic sulfinic compound as a catalyst, comprising the inclusion of auxiliary reagents which bring about rapid and efficient fixing, inactivating or desensitization of the composition by application of heat, the photo-redox catalyst system with said fixing or desensitizing reagent functioning substantially as effectively under normal photopolymerizing conditions as it would in the absence of said auxiliary reagents.

It is a still further object of this invention to provide a photo-redox catalyst system containing an organic sulfinic compound as a catalyst and fixing, inactivating or desensitizing reagents which can be stored with the photo-redox catalyst system for long periods of time without appreciably decreasing the photopolymerization initiating capability of the photo-redox catalyst system.

Figure 1A:
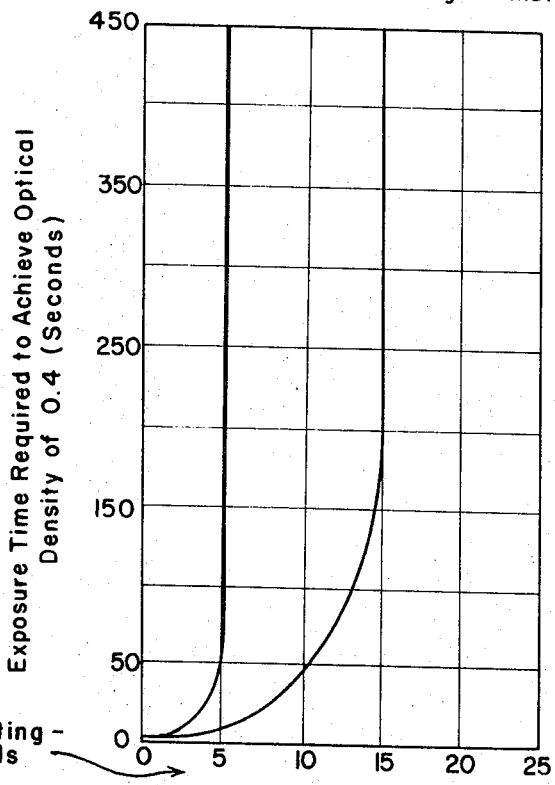
Figure 2:
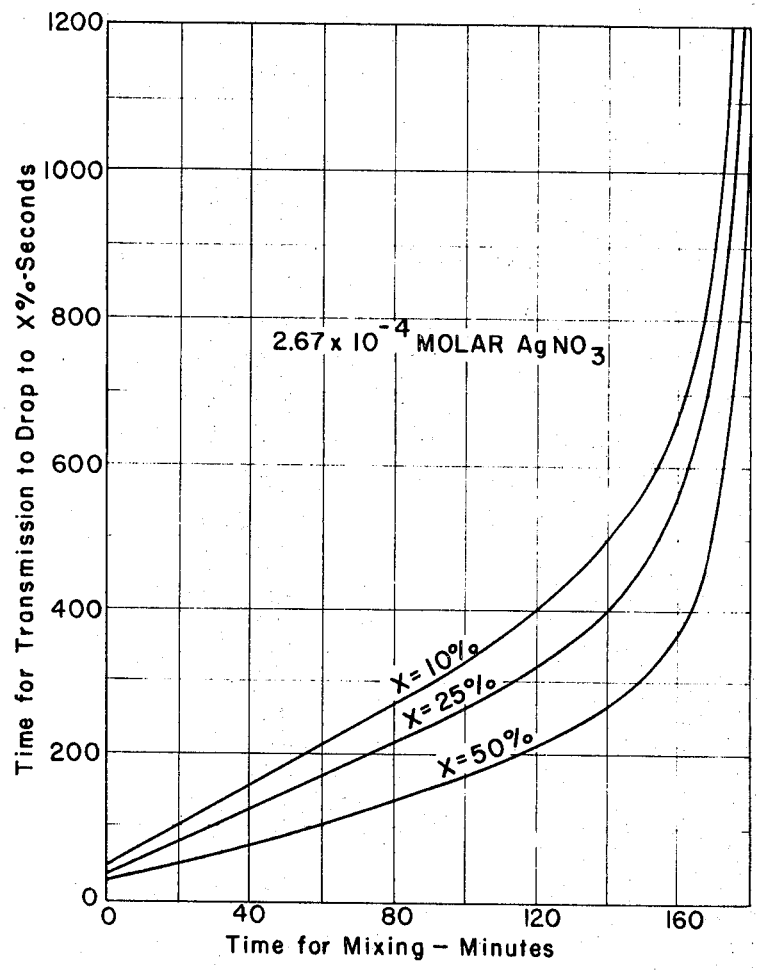
Figure 3:
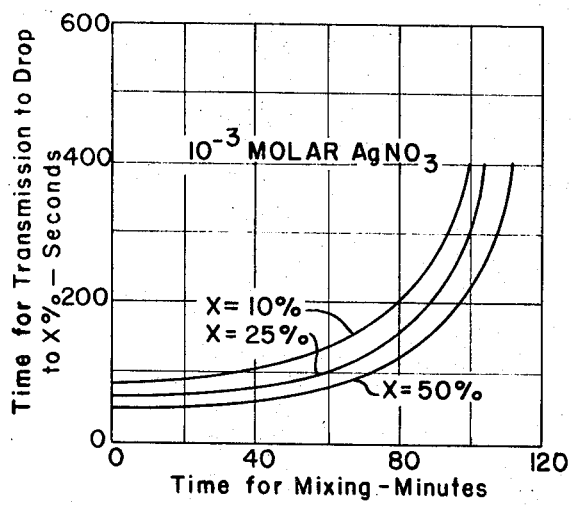
Figure 4:
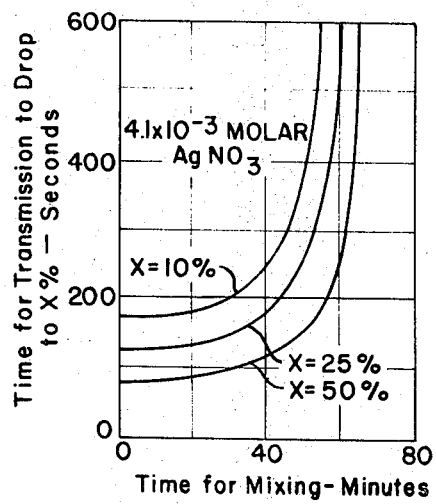

Other objects and advantages of this unique fixing, inactivating or desensitizing method and means will become apparent from the following description of the drawings in which:

FIG. 1 is a graph illustrating the increase in rate of fixing, inactivation or desensitization of one of the herein described photosensitive compositions produced by the presence of a silver compound in such a photosensitive composition;

FIG. 1a is a graph illustrating the increase in rate of fixing, inactivating or densensitization due to silver addition to a photosensitive composition similar to the photosensitive composition of FIG. 1 except for a lower pH and a higher heating temperature which combine to provide an ultrarapid rate of fixing, inactivation or densensitization; and FIGS. 2, 3 and 4 illustrate the effect of varying the concentration of a fixing, deactivating or desensitizing compound forming part of this invention, in a light sensitive polymerizable photopolymer composition.

It is now discovered that the rate of fixing, deactivating or desensitization of the photopolymerizable composition can be significantly increased after its exposure to visible light, without physically removing the unreacted monomeric materials of the photo-redox catalyst system; rather these materials may be retained in the medium containing the image in a completely inactive state. More specifically, an improved rate of fixing, inactivation or desensitization is accomplished by the addition of small amounts of silver compounds which are soluble in the particular photosensitive composition to said light sensitive photopolymer compositions containing the photo-redox catalyst system, and, after exposure of the medium to radiant energy required to activate the system, the light sensitive photopolymer composition is quickly desensitized without affecting the photopolymer image, by the mere addition of heat to the medium and is also desensitized, though less rapidly, at room temperature without affecting the photopolymer image.

This is an entirely startling and unexpected discovery because those skilled in the art are aware that silver itself is photosensitive, and it would hardly be expected that fixing or desensitization could be accomplished by these means. The mechanism of the action of the silver for the fixing or desensitization of a normally light sensitive photopolymer composition is not fully understood. It appears reasonable, however, to suppose that the fixing or desensitization action involves removal or modification of the sulfinic compound by catalyzing its oxidation or its addition to monomer or the like. However, this explanation of the phenomenon must not be construed as altering or affecting the spirit and scope of this invention.

The fixing, inactivation or desensitization of the normally light sensitive photopolymer material containing a photo-redox catalyst system by means of a silver is a chemical catalytic reaction characterized by a rate constant $k$. This rate constant varies according to the well known Arrhenius equation:

$$\frac{d \ln k}{dT} = \frac{\Delta E^*}{RT^2} \quad (1)$$

In its integrated form this is $$\ln k = -\frac{\Delta E^*}{RT} + C \quad (2)$$

In the latter equation, $\Delta E^*$ is a characteristic constant for the reaction and is called the energy of activation, C is a characteristic constant for the reaction, and R is the universal gas constant. The only physical variable which affects the rate constant is, therefore, T, the absolute temperature.

As the temperature is increased, the rate constant increases. Therefore, the medium containing the light sensitive photopolymerization composition and the soluble silver compound is heated to quickly effect fixing and desensitization; and upon heating of the medium, it is found that the fixing and desensitization process essentially obeys the chemical rate Equation 2.

This variation of rate constant with temperature is extremely large. It is found that upon cooling the light sensitive photo-redox polymer composition containing silver ion to a temperature substantially below zero degrees centigrade, the material remains highly light sensitive for many months. At room temperature, the same light sensitive polymer composition becomes fixed or desensitized in several hours. At somewhat elevated temperature, fixing and desensitization of the same light sensitive photopolymer composition occurs in minutes, and, at temperatures approaching the boiling point of water, the desensitization can be made to occur in seconds, as shown in Example 2.

Solvents other than water show different rate constants, but all light sensitive photopolymer compositions containing the photo-redox catalyst system and the soluble silver compounds respond to fixing in essentially the same manner, to wit: fixing or desensitization is greatly accelerated by an increase in temperature. It is thus to be understood that when the application of heat is called for, it is for the purpose of enormously accelerating the fixation or desensitization reaction so that said fixing and desensitization can be practically observed and utilized within a short period of time.

Other substantial advantages of the method and means for fixation, inactivation or desensitization of the light sensitive photopolymer compositions of this invention will now be set forth. First, it is found that the products of interreaction between the desentizing silver compound and the other components in the medium do not deleteriously affect the image produced. Therefore, the products formed need not be removed as by a solvent removal. Secondly, while the light sensitive photopolymer composition containing a fixing agent or desensitizing material remains light sensitive only for several hours at room temperature, the photo-redox catalyst system remains at or close to its optimal efficiency for a sufficient period of time, e.g., ten seconds to thirty minutes or more, to enable substantially unimpaired rate if image formation. Once the image is formed, fixing, inactivation or desensitization can take place rapidly and in a matter of seconds merely by raising the temperature substantially above room temperature, e.g., to 40° C. or higher, the final image being retained in substantially its originally defined state.

In general, the light sensitive photopolymer composition containing desensitizing compounds is prepared by bringing together (a) small amounts of a soluble silver compound (hereafter designated as a "fixing or desensitizing agent") in a particular medium, such as a solution or dispersion, (b) the photo-redox catalyst system in a suitable solvent or dispersion, (c) a pH-lowering agent and (d) a photopolymerizable ethylenically unsaturated material, as a vinyl monomer in a medium, such as a solution of said monomer, as set forth in said copending application.

Components (a), (b), (c) and (d) above described may be brought together simultaneously or in any other order. The monomer component may be initially combined with a photo-oxidant, and the component containing the sulfinic acid compound and the compound containing the fixing or desensitizing agent may be added later. It is also possible in some instances to prepare the organic sulfinic compound together with the monomer, and to add later the component containing the fixing and desensitizing agent, the component containing the photo-oxidant and the pH-lowering agent.

Addition of a silver salt to the photopolymer composition may also be accomplished by initially adding the salt to a solution containing the sulfinic compound; to a solution of the photo-oxidant; to a solution containing a photo-redox catalyst system; to a solution of the pH-lowering agent; or to a solution containing a photo-redox catalyst and a photopolymerizable monomer. However, where an admixture is produced which is light sensitive, the mixing step producing such admixture must be performed in the dark, as must all later steps involving such admixture.

The photopolymerization process of the present invention is preferably carried out in solvent medium, i.e. a solution of the involved compounds including the fixing or desensitizing ions. The particular solvent employed will be one that is compatible for the components of this invention. Thus, if the monomer, the photo-redox catalyst system, the pH-lowering agent, and the fixing, inactivating or desensitizing component are mutually soluble, such as in a system employing, for example, acrylamide as the monomer, and thionine as the photo-oxidant, sodium p-toluenesulfinate as the catalyst, acrylic acid as the pH-lowering agent and silver nitrate, a solution may be employed. Where a common solvent for the monomer, photo-redox catalyst system, pH-lowering agent and desensitizing agent is not available, different solvents which are miscible with each other may be employed. Suitable solvents have been used in the process of the present invention, as for example, water, alcohols such as methanol, glycerol and ethylene glycol, dioxane, and the like.

Turning now to the specific components utilizable in this invention, the monomers will first be discussed. The monomers suitable for photopolymerization by the photo-redox catalyst system are described in said copending application. Such monomers will be referred to herein by the term "vinyl monomers", and this term includes vinylidene chloride, vinyl methyl ether, vinyl butyl ether, vinyl butyrate, styrene, vinyl benzoate, methyl methacrylate, calcium diacrylate, barium diacrylate, acrylic acid, acrylonitrile, acrylamide, and the like.

The amount of vinyl monomer in the reaction medium can vary within extremely wide limits. On the one hand, the amount of monomer employed may be the maximum amount of the particular monomer soluble in a particular solvent. On the other hand, the monomer may be present in small molar concentrations of the order of $10^{-2}$ or $10^{-3}$ molar. In general, it is preferable to use relatively high monomer concentrations (greater than about $2.5 \times 10^{-3}$ molar) because it has been found that the rate of photopolymerization materially decreases at lower monomer concentrations.

The terms "molar" and "moles per liter," as used herein, designate component concentrations in terms of the total volume of photosensitive composition.

To show the decreasing sensitivity to light used to produce a photopolymer image, reference is made to the data of Table 1. The data of Table 1 was obtained by metering the amount of light transmitted through a photosensitive composition containing varying amounts of barium diacrylate, when irradiated with a light source of constant intensity.

TABLE 1

| Percent by weight of barium diacrylate: | Exposure time to achieve an optical density of 0.1 (sec.) |
| --- | --- |
| 36 | 3.2. |
| 7.2 | 28.6. |
| 3.6 | 116.8. |
| 0.72 | Did not reach 0.1 within 1600 sec. |
| 0.36 | No polymerization within 2000 sec. |

It is highly desirable to utilize monomers having a functionality greater than two, so that highly cross-linked polymers which are insoluble and infusible are obtained at a low degree of conversion. It is known that the greater the functionality of a monomer, the lower the degree of conversion at the gel point (or the point at which insolubility of the polymer sets in). This being the case, a discernible photographic image is obtainable by the process of the present invention at low light levels and in short periods of time when monomers of high functionality are employed. Monomers having a functionality higher than two are typified by: N,N'-alkylenebisacrylamides, secondary acrylamides, tertiary acrylamides, di- or trivalent metal salts of acrylic or methacrylic acid, and the like. Such polyfunctional compounds are generally designated in the art as "cross-linking" agents, and suitable examples for use in the process of the present invention are:

(1) alkylenebisacrylamides and their derivatives having the general formula:

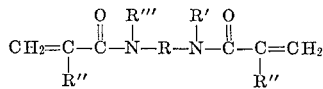

(2) secondary acrylamides or derivatives thereof having the general formula:

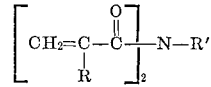

(3) tertiary acrylamides or derivatives thereof having the general formula:

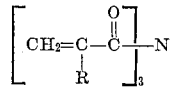

(4) and the divalent or trivalent metal salts of acrylic acid or its derivatives having the general formula:

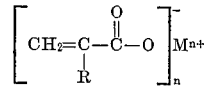

where $n$ is greater than one and M may be calcium, barium, strontium, magnesium, zinc, or aluminum, for example. Whereas R, R', and R" may be H, OR''', alkyl, aryl, alkaryl, arylalkyl, and mixtures thereof, with R''' the same, as known to the art, the alkyl preferably being an aliphatic of 1 to 4 carbon atoms and the aryl an aromatic ring compound of at least 6 carbon atoms.

As specific examples of the above groups of cross-linking agents (1), (2), (3) and (4), N,N'-ethylenebisacrylamide, methyl-diacrylylamide, tri(methyl acrylyl) amide and calcium diacrylate, respectively, may be used. Additionally, for example, the following compounds may be used as cross-linking agents: triallyl cyanurate, divinyl benzene, divinyl ketones, diglycol-diacrylate, mixtures of the same, and the like. Such cross-linking agents are inclusive of the methylene, ethylene, propylene, butylene compounds of the above character, as illustrated. Such cross-linking agents are also vinyl monomers with a functionality greater than 2. Accordingly, a single one, or mixtures, of the suitable monomers may be utilized, in photosensitive compositions, as herein described.

The cross-linking agent may be used alone or in conjunction with monomers having a functionality of two, as is known to the art. Where the latter combination is used, the cross-linking agent is generally employed in an amount ranging from 10 to 50 parts of bifunctional monomer to one part of cross-linking agent.

As mentioned in said copending application, only very small amounts of the catalysts are needed in the photo-redox catalyst system for photopolymerization. Thus, photo-redox polymerization, according to the present invention, may be achieved by using concentrations of the catalyst as small as $10^{-6}$ moles per liter. Hence, when measured against the quantity of the monomer, the amount of the catalyst can be exceedingly small. As an example, one-tenth of a millimole of organic sulfinic compound catalyst per liter of solution has been used to achieve a very satisfactory rate of photopolymerization. Higher concentrations, e.g., $10^{-2}$ molar, may result in somewhat accelerated rates of photopolymerization.

The organic sulfinic compounds of said copending patent application are the aromatic and aliphatic organic sulfinic acids and derivatives thereof. The derivatives of the organic sulfinic acids which have been employed and found suitable are sulfinyl halides, sulfinamides, salts and organic esters of the organic sulfinic acids, as well as adducts of sulfinic acids with carbonyl compounds and especially aldehydes. Each of these organic sulfinic compounds is characterized by its ability to form a free radical by giving up an electron to the photo-oxidant in its activated or photoactive state. The free radicals so derived from the organic sulfinic compounds are capable of initiating polymerization of the aforedescribed vinyl monomers.

Examples of organic sulfinic acids are: p-toluenesulfinic acid, benzenesulfinic acid, p-bromobenzenesulfinic acid, naphthalenesulfinic acid, 4-acetamidobenzenesulfinic acid, 5-salicylsulfinic acid, ethanesulfinic acid, 1,4-butanedisulfinic acid, and α-toluenesulfinic acid. The salts of these acids may be any of the soluble salts which are compatible with the other components employed in the photosensitive solution and typically include the sodium salts, the potassium salts, the lithium salts, the magnesium salts, the calcium salts, the barium salts, the silver salts, the zinc salts and the aluminum salts. Appropriate esters of these acids typically include the methyl esters, the ethyl esters, the propyl esters and the butyl esters.

The sulfinyl halides, for example, include sulfinyl chlorides, as ethanesulfinyl chloride, and sulfinyl bromides, as 5-salicylsulfinyl bromide, and the like. The sulfinamides include, for example, ethanesulfinamide, the N-alkylsulfinamides such as N-methyl-p-toluenesulfinamide, and the N-arylsulfinamides such as N-phenylbenzenesulfinamide. Illustrative aldehyde adducts of these sulfinic acids are, for example, the adducts formed with formaldehyde, acetaldehyde, isobutyraldehyde, heptaldehyde, and the like.

The photo-oxidant compounds for use in the photo-redox catalyst system of this invention are any of those compounds that absorb sufficient radiation within the wavelengths of about 3800 A. to about 7200 A. to thereby attain a photoactive or photo-oxidant level, provided that at such level, the photo-oxidant compounds are capable of reacting with an organic sulfinic compound to remove an electron therefrom to produce a polymerization initiating, highly reactive free radical.

The specific photo-oxidants usable in the process of this invention are those disclosed in said copending application and are incorporated herein by reference. More specifically, they are members of the quinoidol dye family such as phenothiazine dyes, phenazine dyes, acridine dyes, xanthene dyes, phenoxazine dyes and pyronine dyes.

The minimum required concentration of photo-oxidant of the photo-redox catalyst system which is used in conjunction with the organic sulfinic compound is approximately $10^{-7}$ moles per liter. As the photo-oxidant concentration is increased above this minimum concentration, the sensitivity of the photopolymer composition does increase; however, the sensitivity may pass through a maximum as the photo-oxidant concentration is further increased so that it may be desirable to avoid high concentrations ($10^{-2}$ moles per liter or more), especially when the photosensitive solution to be polymerized is of greater thickness than a very thin film. However, since the optical properties of the photo-oxidant are dependent upon the quantities present, as well as upon the intensity of the radiation employed, the criteria for determining the proper or practical quantities of photo-oxidant and of organic sulfinic compound to be employed will be governed by considerations other than just the amount needed for catalyzing the photopolymerization reaction.

In general, while the ratios of the components of the photosensitive compositions usable in the process of this invention are of little significance, the concentration of each component, individually, is important. Thus, if the concentration ranges, heretofore set forth are met, rapid polymerization will, in general, occur when illuminated with light of appropriate wavelength prior to inactivation or desensitization regardless of the relative ratios of the components.

The pH of the photosensitive composition may be altered by adding various acids thereto. Such acids include strong and weak acids, inorganic and water soluble organic acids. For example, hydrochloric acid, sulfuric acid, phosphoric acid, formic acid, acetic acid and acrylic acid may be used. It is preferable, where the vinyl monomer is used in the form of a salt, for example, barium diacrylate, to use acids which do not produce a precipitate with such salts.

Hydrochloric acid is a suitable example of a non-precipitate forming acid whereas sulfuric and phosphoric acids produce precipitates with, for example, barium diacrylate. Where a precipitate is produced, it should be filtered off prior to exposing the photosensitive composition to image forming light. If such a precipitate is not removed, the detail of the photopolymer image will be significantly reduced.

The photosensitive compositions comprising a vinyl monomer, a photo-oxidant, a catalyst and a pH lowering agent may be fixed and desensitized, as described in said copending application by reducing the pH of the photosensitive composition below about pH 7. The rate of desensitization can be increased by heating the photosensitive compositions at temperatures substantially above ambient temperature. This method produces complete fixation or desensitization, generally, after 2 to 15 minutes heating time. However, the rate of fixation or desensitization is substantially increased when a small amount of soluble silver material is included in the photosensitive composition.

The increase in rate of fixing and desensitization in the presence of silver as compared with the rate of fixing or desensitization of the same photosensitive composition in the absence of silver, for a given temperature, is shown by the following example (Example 1).

An aqueous photosensitive solution was made up containing 29.7 percent by weight barium diacrylate, $1.67 \times 10^{-2}$ moles/liter of sodium p-toluenesulfinate and $2 \times 10^{-4}$ moles/liter of methylene blue. This solution had a pH of 5.6.

The above solution was divided into two parts. One part was designated Solution A. To the other part was added sufficient silver nitrate to make this part, designated Solution B, $1.67 \times 10^{-2}$ molar in silver nitrate.

Each of these solutions was divided and the resulting portions were placed in individual slides consisting of two glass plates separated by a peripheral shim spacer 7 mils thick. The filled slides were placed in a water bath at 55° C. for varying periods of time.

After heating, each slide was exposed to light of constant intensity and the transmitted light was monitored by a photomultiplier tube. The time required for the optical density of the photosensitive compositions to reach 0.1 was recorded. The resulting data are represented graphically in FIG. 1 in which Curve 1 represents the desensitization of Solution A (no silver) and Curve 2 represents the desensitization of Solution B (containing silver ions).

As is readily apparent from a comparison of Curves 1 and 2 of FIG. 1, fixation or desensitization is greatly accelerated by the addition of even small quantities of silver ions to the photosensitive composition. Thus, with silver present, the photosensitive composition requires only a heating of about 20 minutes (i.e., is to be completely fixed and desensitized). Without silver, fixing or desensitization is achieved only after 35 minutes of heating.

The substantial increase in the rate of desensitization of the herein described photosensitive composition (including silver) as compared with the photosensitive compositions of said copending application is further shown by FIG. 1a. The data graphically represented in FIG. 1a were obtained as described in Example 2. In brief, the components of the photosensitive compositions of Examples 1 and 2 are the same; however, the fixing or desensitization rate of the photosensitive compositions of Example 2 was made faster than the fixing or desensitization rate of the photosensitive compositions of Example 1 by employing a higher heating temperature and by lowering the pH of the photosensitive composition in Example 2. In spite of the basic increased rate of desensitization in the absence of silver, the rate of fixing or desensitization of the silver containing photosensitive composition of Example 2 (FIG. 2, Curve 2) is substantially faster than the fixing or desensitization rate of the photosensitive composition of Example 2 without silver (FIG. 2, Curve 1).

From the foregoing, it will be appreciated that the rate of fixing, inactivation or desensitization of the herein described photosensitive compositions will be substantially increased, whether the rate of fixing, inactivation or desensitization of such compositions is relatively fast or slow in the absence of silver, when a soluble silver compound is introduced into said photosensitive compositions.

As shown by Example 1 and Example 2, fixing or desensitization of the photosensitive compositions of this invention is accelerated by the presence of silver when the pH of these photosensitive compositions is at about pH 5.6 and pH 4.6, respectively. Additionally, the silver ions accelerate fixing or desensitization of the photosensitive compositions of this invention having pH's as high as about pH 8.0. Care should be taken in lowering pH to a value on the order of 2, by said addition, to avoid precipitation in the solution, as herein provided. Preferably a pH range on the order of 4 to 8 is used.

Within the pH range up to about pH 8, the rate of fixing or desensitization increases as the photosensitive composition is heated. For very rapid desensitization rates, it is preferable to heat the photosensitive composition of this invention above about 40° C. There is, however, a limiting temperature above which the photosensitive composition should not be heated. This limiting temperature is about the boiling point of the lowest boiling component in the photosensitive composition. In general, the lowest boiling component will be the solvent in the photosensitive composition.

The rate of fixation or desensitization of the photopolymer composition varies substantially with the amount of silver at any given temperature. Thus, FIGS. 2, 3 and 4 illustrate the greatly increased rate of fixation or desensitization caused by increased amounts of silver. The "stock" light sensitive photopolymer composition employed to obtain the data graphically represented in FIGS. 2, 3 and 4 was prepared by mixing the following solutions in the dark:

| | Ml. |
|---|---|
| Barium diacrylate aqueous solution containing 0.5 grams of barium diacrylate per ml. of solution. | 35 |
| $1.07 \times 10^{-3}$ molar aqueous methylene blue solution | 5 |
| 0.1 molar aqueous sodium p-toluene-sulfinate solution | 5 |

Three concentrations of aqueous silver nitrate were prepared as follows:

(a) $2.67 \times 10^{-2}$ molar aqueous silver nitrate solution
(b) $1.00 \times 10^{-1}$ molar aqueous silver nitrate solution
(c) $4.10 \times 10^{-1}$ molar aqueous silver nitrate solution Light sensitive solutions (A), (B) and (C) were prepared from 4.5 ml. of the stock solution and 0.5 ml. respectively of the silver nitrate solutions (a), (b) and (c), respectively. The solutions were mixed by stirring with a stream of nitrogen gas passing through a constricted glass tube in the dark. Each of the light sensitive solutions (A), (B) and (C) was introduced into a number of cells, each cell being formed by separating two glass plates with a $\frac{1}{16}$-inch thick peripheral rubber gasket.

It will be seen that cells containing light sensitive solutions (A) contained $2.67 \times 10^{-3}$ moles per liter of silver; cells containing light sensitive solutions (B) contained $1.00 \times 10^{-2}$ moles per liter of silver; and cells containing light sensitive solutions (C) contained about $4.10 \times 10^{-2}$ moles per liter of silver. All of the cells contained about $10^{-2}$ moles of sulfinic compound per liter, about 1.25 moles of barium diacrylate per liter and about $10^{-4}$ moles of photo-oxidant per liter.

The cells were individually exposed to a beam of light having a rectangular cross-section emerging from a monochromator. The light had a sharp band of wavelengths centering about 6000 A. The intensity of the light that passed through the cell was monitored by a photomultiplier tube and the intensity, so monitored, was recorded on a sensitive strip chart recorder.

As polymerization of the barium diacrylate occurred due to the action of the monochromatic light, insoluble barium diacrylate polymer precipitated, and the transmitted light reaching the photomultiplier tube decreased as a function of the increase in polymer. The temperature of the solutions was maintained at about 22° C. from the time of mixing to exposure to light from the monochromator. The time from mixing the various samples of photosensitive solutions with the silver nitrate solutions was recorded as an abscissa coordinate, and this coordinate represents the time during which the fixation or desensitizing reaction was allowed to take place. The time required for the transmitted light intensity to drop to 50%, 25% and 10% of its original value was recorded as an ordinate coordinate.

FIGS. 2, 3 and 4 graphically illustrate rates of desensitization of light sensitive solutions (A), (B) and (C), respectively.

It will be seen that all the curves of FIGS. 2, 3 and 4 approach typical asymptotes depending upon silver concentration. These asymptotes represent times from mixing to points where polymerization time becomes essentially infinite or, in other words, the time when the normally light sensitive solutions become light insensitive or are "fixed." It can be seen that substantially complete desensitization occurs in about 3 hours with a $2.67 \times 10^{-3}$ molar concentration of aqueous silver nitrate; in about 1.75 hours with a $1.00 \times 10^{-2}$ molar concentration and in about 1 hour with a $4.10 \times 10^{-2}$ molar concentration. Thus, it will be seen that significant changes in desensitization time can occur merely by changing the concentration of desensitization agent without any increase in temperature.

It is believed that the silver acts to desensitize the photosensitive solution in the same way at very low concentrations, e.g., $1 \times 10^{-4}$ moles/liter. However, it has been found that a practical lower limit of silver concentration exists at about $1 \times 10^{-3}$ moles/liter.

On the other hand, silver concentrations as high as $4 \times 10^{-2}$ moles/liter, or about 140 times the lower concentration limit have been used successfully. Higher concentrations of silver can be used with good results. However, an upper silver concentration limit will probably be reached at the solubility limit of the silver salt, e.g., silver acrylate, in the photosensitive solution.

The ratio of the amount of silver to the amount of organic sulfinic compound does not appear to be important. Rather, the concentrations of the individual components are important. Thus, as long as the minimum concentrations of the organic sulfinic compound and of the silver compound exceed the minimum concentrations of each as heretofore described, both the image forming step and the desensitization process of this invention will proceed rapidly.

Silver is usually added to the light sensitive photopolymer composition in the form of organic and inorganic salts soluble in the medium in which the photopolymer composition is placed. For example, silver may be added as silver nitrate, silver acetate or silver benzoate, if the medium in which the photopolymer composition is placed in an aqueous medium. The salts containing silver may also be added in the form of relatively soluble complexes such as silver iodide in polyvinyl-pyrrolidone (see Example 4 herein). Such complexed silver compounds are referred to herein and in the claims by the generic expression silver compound.

For some purposes, it is necessary to have available a photosensitive composition which can be irradiated to produce a photopolymer image and then rapidly fixed or desensitized without the need to add any agents to the existing photosensitive composition. As described herein and in said copending application, desensitization will occur even at low temperature, e.g., room temperatures, when the photosensitive composition has a low pH and contains silver ions. Therefore, to provide a photosensitive composition having a reasonably long shelf life, the photosensitive composition should be stored at temperaturets below about room temperature and these compositions should have relatively high pH's, e.g., 8 or higher.

The storage temperature will be any temperature which will provide the required shelf life. Thus, as the storage temperature decreases, the shelf life increases. Usable storage temperatures include temperatures below zero degrees centigrade.

The requisite storage pH can be provided by using latent pH lowering agents as described in the said copending application. Such agents include those compounds capable of splitting off an acid group when heated. Thus, the use of latent pH lowering agents to provide the pH necessary for fixation and desensitization permits storage of the photosensitive compositions at pH's substantially above the pH's required for rapid fixing of polymerization or desensitization, i.e., above about pH 8, while providing pH's below about pH 8 when the photosensitive compositions are heated. As latent pH lowering agents, the following compounds may be used: chlorohydrin, 1,3 - dichloro-2-propanol, chloroacetic acid, dichloroacetic acid, and the like, as well as hydrolyzable esters which can split into an acid and an alcohol when heated such as ethyltosylate, hydroxyethyl trifluoroacetate, and the like.

In practice, polymer formation within the reaction medium of this invention occurs rapidly at room temperature when irradiated with light having wavelengths lying within the wavelength region between about 3800 A. to about 7200 A. When the density of the image formed is sufficiently intense, exposure is discontinued and the reaction medium may be stored or preferably be quickly raised in temperature by application of heat to fix and desensitize the partially polymerized medium.

The process of this invention will be further illustrated by the following examples.

EXAMPLE 2

This example illustrates the substantial increase in rate of desensitization due to the presence of silver in a photosensitive composition even when the rate of desensitization is rapid in the absence of silver.

A barium diacrylate solution (Solution A) was prepared by adding 321 g. of barium hydroxide octahydrate to a solution of 144 g. of freshly distilled acrylic acid in 150 ml. of distilled water. Acrylic acid was then added to adjust the pH to 4.6, and the solution was filtered.

A photocatalyst solution (Solution B) was prepared by mixing 2.14 g. of sodium p-toluenesulfinate dihydrate and 0.030 g. of methylene blue in 100 ml. of distilled water.

Solution C was prepared by dissolving 1.70 g. of silver nitrate in distilled water (100 ml.)

Solution D was prepared by mixing 2.0 ml. of Solution A, 0.5 ml. of Solution B, and 0.5 ml. of Solution C.

Solution E was prepared by mixing 2.0 ml. of Solution A, 0.5 ml. of Solution B, and 0.5 ml. of distilled water.

Each of the photosensitive Solutions D and E was tested in a slide consisting of two glass plates separated by a peripheral shim spacer 7 mils thick. The filled slides were placed in a water bath at 85° C. for several seconds, then exposed immediately to light from a 500-watt tungsten filament lamp at an intensity of about 6.25 milliwatts/cm.[2]. As polymerization took place to form opaque polymers, there was a corresponding decrease in transmitted light. The polymerization was followed by measuring the transmitted light with a photomultiplier tube. The results are recorded in Table 2.

TABLE 2

| Solution: | Heating time at 85° C. (sec.) | Exposure time required to achieve an optical density of 0.4 (sec.) |
| --- | --- | --- |
| D (Ag+ present) | None | 5.8 |
| D | 5 | (1) |
| D | 7 | (2) |
| E (no Ag+) | None | 6.4 |
| E | 10 | 42.0 |
| E | 15 | (3) |

[1] Slight polymerization within 500 sec.
[2] No polymerization in 530 sec.
[3] No polymerization in 480 sec.

As is evident from Table 2, fixation or desensitization of the photosensitive composition containing no silver was very rapid (about 15 seconds). However, in the presence of silver, fixation or desensitization of this photosensitive composition occurred in about one-half the time required for fixing and desensitizing of the photosensitive composition without silver.

EXAMPLE 3

This example illustrates the effect of silver on the rate of fixing and desensitizing of photosensitive compositions containing various sulfinic acid derivatives as the catalyst component.

Solutions A–G, inclusive, were made as follows:

Solution A: Acrylic acid (144 ml.) was added to an aqueous solution of barium hydroxide prepared from barium hydroxide octahydrate (315 g.) and distilled water (315 ml.). The resulting solution was heated to 60–80° C. and kept at that temperature for two hours. It was then treated with about 16 g. of activated carbon and filtered. The pH of the solution was adjusted to 5.22 by the addition of acrylic acid.

Solution B: Methylene blue (0.0229 g.) was dissolved in methanol (100 ml.).

Solution C: Silver nitrate (1.7055 g.) was dissolved in distilled water (100 ml.).

Solution D: Sodium p-toluenesulfinate dihydrate (2.150 g.) was dissolved in distilled water (100 ml.).

Solution E: Sodium benzenesulfinate (0.825 g.) was dissolved in distilled water (50 ml.).

Solution F: 4-acetamidobenzenesulfinic acid (0.985 g.) was mixed with distilled water (50 ml.), and a concentrated sodium hydroxide solution (5 drops) was added to effect complete solution of the acid.

Solution G: Hydroxymethyl p-tolyl sulfone [1] (0.932 g.) was dissolved in distilled water (50 ml.).

Test solutions were prepared from the above solutions as shown in Table 3.

[1] This is an example of an adduct of paratoluene sulfinic acid and formaldehyde.

TABLE 3

| Test solution | Component solution, ml. A | B | C | Sulfinic compound solution, ml. | Water, ml. |
|---|---|---|---|---|---|
| H-1 | 2.0 | 0.5 | 0.5 | Solution D, 0.5 | (¹) |
| H-2 | 2.0 | 0.5 | (¹) | ...do... | 0.5 |
| J-1 | 2.0 | 0.5 | 0.5 | Solution E, 0.5 | (¹) |
| J-2 | 2.0 | 0.5 | (¹) | ...do... | 0.5 |
| K-1 | 2.0 | 0.5 | 0.5 | Solution F, 0.5 | (¹) |
| K-2 | 2.0 | 0.5 | (¹) | ...do... | 0.5 |
| L-1 | 2.0 | 0.5 | 0.5 | Solution G, 0.5 | (¹) |
| L-2 | 2.0 | 0.5 | (¹) | ...do... | 0.5 |

¹ None.

Portions of these test solutions were placed in glass cells formed from two thin glass plates separated by plastic peripheral shims 7 mils thick. These cells were heated in an oven with a temperature of 80° C. for varying periods of time. Each cell, when it was removed from the oven, was allowed to cool between metal plates for four minutes and then placed in a beam of light from a 500-watt tungsten filament projection lamp operated at 115 volts. The intensity of the incident light was approximately $1.2 \times 10^{-3}$ watts/cm.² and was kept constant. The transmitted light was measured with a photomultiplier tube and was automatically recorded as a function of time. The effect of the length of the period of heating on the polymerization behavior in light is noted in Table 4.

TABLE 4

| Solution | Time of heating at 80° C. min. | Polymerization behavior in light |
|---|---|---|
| H-1 (sodium p-toluene-sulfinate, silver nitrate) | 2 | Polymerized to optical density of 1.0 in 180 sec. |
|  | 4 | Slight polymerization after 300 sec. |
|  | 5 | No polymerization after 15 min. |
| H-2 (sodium p-toluene-sulfinate, no silver nitrate) | 5 | Polymerized to optical density of 1.0 in 40 sec. |
|  | 6 | Slight polymerization. |
|  | 7 | No polymerization after 15 min. |
| J-1 (sodium benzene-sulfinate, no silver nitrate) | 4 | Polymerized to optical density of 1.0 in 38 sec. |
|  | 5 | Polymerized to optical density of 0.2 in 194 sec. |
|  | 7 | No polymerization after 15 min. |
| J-2 (sodium benzene-sulfinate, no silver nitrate) | 5 | Polymerized to optical density of 1.0 in 40 sec. |
|  | 7 | Polymerized to optical density of 1.0 in 170 sec. |
|  | 9 | No polymerization after 15 min. |
| K-1 (4-acetamidobenzene-sulfinic acid, silver nitrate) | 5 | Polymerized to optical density of 0.2 in 120 sec. |
|  | 6 | No polymerization after 15 min. |
| K-2 (4-acetamidobenzene-sulfinic acid, no silver nitrate) | 6 | Polymerized to optical density of 0.2 in 36 sec. |
|  | 7 | Slight polymerization after 230 sec. |
|  | 9 | No polymerization after 10 min. |
| L-1 (hydroxymethyl p-tolyl sulfone, silver nitrate) | 4 | Polymerized to optical density of 0.2 in 36 sec. |
|  | 6 | No polymerization after 12 min. |
| L-2 (hydroxymethyl p-tolyl sulfone, no silver nitrate) | 6 | Polymerized to optical density of 0.2 in 42 sec. |
|  | 7 | No polymerization after 15 min. |

It is apparent that the fixing or inactivation of the photosensitive solution was catalyzed by the silver salt in each case.

EXAMPLE 4

This example illustrates the ability of a silver fixing and desensitizing agent to permit fairly rapid fixation of photopolymerization of strontium diacrylate and still desensitize the reaction medium within two hours *without* the use of heat during the desensitizing period.

Several solutions were prepared separately as follows:

(A) The silver solution: 9.6 ml. of 45% aqueous solution of polyvinylpyrrolidone known to the trade as type K-60 and 4.3 ml. of 0.1 molar aqueous silver nitrate solution were mixed and stirred to obtain a homogeneous clear solution. The primary purpose of the polyvinylpyrrolidone was to add viscosity to the solution so that it would form a more satisfactory film on glass. Then, in the dark, 8.5 ml. of a $5 \times 10^{-2}$ molar aqueous solution of potassium iodide were added dropwise with stirring. A homogeneous, clear, non-hazy solution was obtained.

The solubility of silver iodide in water at about room temperature is $3 \times 10^{-7}$ g. per 100 ml. In the above clear solution there was dissolved about 1.34 g. of silver iodide per 100 ml. of water. Since there are about seven orders of magnitude more silver iodide dissolved than could normally be accommodated, a complex or molecular compound must have been formed with the polyvinylpyrrolidone.

(B) The photo-redox catalyst system: This was prepared from 2.14 g. sodium p-toluenesulfinate dihydrate and .025 g. thionine. These were placed in a volumetric flask and dissolved by warming in about 70 ml. of 97% glycerol. The flask was cooled to room temperature and the total volume was made up to 100 ml. by the addition of more glycerol.

(C) A light sensitive solution was prepared:

|  | Ml. |
|---|---|
| Strontium diacrylate aqueous solution containing 35.4% strontium diacrylate | 2 |
| Solution A | 2 |
| Solution B | 0.5 |

The ingredients were mixed in the dark to form a homogeneous, clear solution which was placed between two glass plates separated by a cellulose acetate shim 6 mils thick around the periphery of the plates.

Shortly after the above ingredients were mixed, a photographic negative of a human subject was projected onto the film of light sensitive material using white light having an intensity of about $10^{-3}$ watts/cm.² at the film surface. Upon an exposure time of 35 seconds, a good reproduction was obtained without any immediately visible reaction of the latent silver component of the composition. The reproduction was stored in the dark, at room temperature, for two hours. At the end of this time, the slide was found to have been permanently fixed and was suitable for viewing in a slide projector.

EXAMPLE 5

This example, performed at room temperature, illustrates the effect of time on the fixing, inactivating and desensitizing capabilities of the latent silver fixing or desensitizing agent. A light sensitive composition was prepaded in the dark by mixing:

|  | Ml. |
|---|---|
| Aqueous barium diacrylate solution containing 56% barium diacrylate | 3 |
| Solution A of Example 4 (having silver nitrate) | 1 |
| Solution B of Example 4 (no silver nitrate) | 0.5 |

A clear, homogeneous solution was secured. Part of this solution was divided between two small vials, Vial D and Vial E.

Vial D was exposed immediately to light having an intensity of about $10^{-4}$ watts/cm.² at the vial surface.

The contents of Vial D gelled and became cloudy and opaque in 25 seconds with the development of a slight exothermic reaction.

Vial E was stored overnight in the dark at room temperature. On exposure to light having an intensity of about $10^{-4}$ watts/cm.$^{-2}$ at the vial surface, the contents of the vial remained clear and fluid, indicating complete inactivation or desensitization.

Exposure was continued for 96 hours continuously without any change and no photopolymerization of the contents of Vial E observed.

EXAMPLE 6

This example illustrates the effect of the latent silver component as a fixing agent for desensitization of a photosensitive composition at room temperature. In this example, water was used as the solvent for all components and the monomer was barium diacrylate as compared with strontium diacrylate of Example 4.

Solution A was prepared by mixing the following ingredients in the order given:

| | Gms. |
|---|---|
| 45% aqueous polyvinylpyrrolidone solution | 24.7 |
| 0.1 molar silver nitrate aqueous solution | 12.3 |
| 0.1 molar sodium p-toluenesulfinate dihydrate aqueous solution | 11.0 |

A very slightly hazy solution was secured. The primary purpose of the polyvinylpyrrolidone was to add viscosity to the solution so that it would form a more satisfactory film on glass.

Solution B was prepared in the dark in the following manner.

| | Ml. |
|---|---|
| Solution A above | 3 |
| Aqueous barium diacrylate solution containing 56% barium diacrylate | 3 |

Sufficient thionine was added to this clear, homogeneous solution to give a solution which was about $10^{-3}$ molar in thionine.

The light sensitive solution was placed between two glass plates separated by a peripheral shim of cellulose acetate 6 mils thick. It was then exposed to a photographic negative of a human subject projected with white light of an intensity of about $10^{-3}$ watts/cm.$^{-2}$ at the film surface.

An exposure time of 90 seconds produced a good reproduction in the form of light scattering colloidal particles of insoluble polymer. The reproduction was stored in the dark for three hours. In this time it had become completely insensitive to light and could be exposed to light indefinitely without deterioration of the image.

EXAMPLE 7

This example illustrates the effect of heating a light sensitive solution containing a latent silver fixing and desensitizing agent.

A light sensitive composition was made by mixing:

| | Ml. |
|---|---|
| Aqueous barium diacrylate containing 0.5 gm./ml. of barium diacrylate | 5 |
| 0.1 molar aqueous sodium p-toluenesulfinate dihydrate | ½ |
| $10^{-3}$ molar aqueous thionine | ½ |
| $10^{-2}$ molar aqueous silver nitrate | ½ |

The solution was clear, homogeneous and stable in the dark. It was divided equally between two vials. One vial was exposed to white light having an intensity at the vial surface of $2\times10^{-3}$ watts/cm.$^2$. Exposure of five seconds duration caused the contents of the vial to gel and become opaque. The second vial was immersed in a water bath at 95–100° C. for 45 seconds. It was quickly cooled to room temperature and immediately exposed to white light having the same intensity as above. No gelation or opacity developed even after 15 minutes exposure time indicating that the contents of the second vial were completely desensitized.

EXAMPLE 8

The purpose of this example is to illustrate the means whereby a flexible plastic substrate film may be coated with the compositions of this invention, exposed to image forming radiation and thereafter be fixed, inactivated or rendered insensitive to further exposure to light. The following solutions were prepared:

Solution A: Fourteen grams of a commercial polyacrylamide known to the trade as PAM–50, 2.38 grams of sodium p-toluenesulfinate dihydrate and 0.012 gram of thionine were mixed with 100 ml. of distilled water. The mixture was heated on a hot water bath with stirring to about 60° to 80° C. until a clear blue, viscous, bubble-free solution was secured. The solution was very viscous at room temperature.

Solution B: A solution consisting of 50% by weight of barium diacrylate was prepared in distilled water.

Solution C: An aqueous solution containing $10^{-2}$ molar silver nitrate was prepared.

Solution D: Was prepared in the dark by mixing:

| | Ml. |
|---|---|
| Solution A | 2 |
| Solution B | 2 |
| Solution C | ½ |
| 37½% aqueous formaldehyde solution which had previously been acidified by adding acrylic acid | ½ |

Formaldehyde was added to Solution D in order to react with the polyacrylamide of Solution A to produce a strong gel. The gelation reaction of formaldehyde and polyacrylamide proceeds slowly at room temperature but rapidly at elevated temperatures.

The thick and viscous Solution D was spread on a one mil polyethylene terephthalate polymer plastic substrate, known to the trade as "Mylar," film to a thickness of five mils and allowed to stand for a few minutes to thicken somewhat. The substrate film containing the photosensitive film was exposed to a projected photographic negative for 70 seconds to obtain a very clear, well developed image in the photosensitive film. After exposure and still in the dark, the substrate film containing the exposed photosensitive film was heated in an oven at 65° C. for 1¼ hours. In this time, the photosensitive film had become completely desensitized to light and the photosensitive film had become converted into a tough elastic gel because of the reaction of the formaldehyde with the polyacrylamide. The long heating time was allowed primarily to insure the gelation reaction to proceed to completion.

The final product at room temperature was a good photographic image in a tough flexible desensitized film firmly adherent to a tough flexible substrate. The composite film could be bent and twisted without permanently distorting or affecting the photographic image.

As illustrated herein, it will be recognized that suitable photopolymerizable compositions of the above character can be modified with the addition of a latent silver compound for fixing or stopping polymerization, as herein provided.

As shown by the foregoing description and examples, the desensitization of light-sensitive photopolymer compositions containing a vinyl monomer and an organic sulfinic photo-redox catalyst system can be greatly accelerated by the addition of a latent soluble silver material to such light-sensitive compositions. Furthermore, the rate of fixing by desensitization can be controlled by temperature changes to provide light-sensitive compositions which can be stored for months without appreciably impairing the activity of the photo-redox catalyst system or which can be rapidly fixed and desensitized, when desired, after exposure to visible light.

While certain embodiments are disclosed herein, modifications which lie within the scope of this invention will occur to those skilled in the art and as embodied within the scope of the following claims.

What is claimed is:

1. A process for polymerizing and fixing a vinyl monomer image productive system in a photosensitive photopolymerizable composition, which includes the steps of:
  irradiating a photosensitive composition comprising
    (a) a photopolymerizable vinyl monomer system containing,
    (b) an organic photo-oxidant inactive in the absence of light but capable of being raised to a photoactive level when irradiated with visible light having wavelengths lying between about 3800 A. and about 7200 A.,
    (c) an organic sulfinic catalyst capable of releasing an electron to said photo-oxidant when at said photo-active level to produce free radicals capable of initiating polymerization of said vinyl monomer system, and
    (d) a relatively inactive desensitizer for (b) and (c) comprising an ionizable silver compound soluble in said photosensitive composition and capable of inhibiting reaction of said (b) and (c),
  with image producing light having wavelengths lying in the region between about 3800 A. and about 7200 A. to produce a representative photopolymer image in said vinyl monomer system, and heating or storing said photosensitive composition containing said silver compound to inhibit release of said electron and inhibit polymerization thereby.

2. The process of claim 1 wherein said silver compound is a salt material selected from the group consisting of soluble organic and inorganic silver nitrate, silver acetate, silver benzoate, and silver iodide complex.

3. The process of claim 1 wherein the concentration of said silver compound in said photosensitive composition is at least about $1 \times 10^{-4}$ moles per liter of said photosensitive composition.

4. The process of claim 1 wherein said organic sulfinic catalyst is selected from the group consisting of an organic sulfinic acid, a sulfinyl halide, a sulfinamide, an inorganic salt of an organic sulfinic acid, an organic ester derivative of an organic sulfinic acid, and an adduct derived from the combination of an organic sulfinic acid with a carbonyl compound.

5. The process of claim 1 wherein said photo-oxidant is a quinodial dye selected from the group consisting of phenothiazine dyes, phenazine dyes, acridine dyes, xanthene dyes, phenoxazine dyes and pyronine dyes.

6. The process of claim 1 wherein said vinyl monomer is selected from the group consisting of: vinylidene chloride, vinyl methyl ether, vinyl butyl ether, vinyl butyrate, styrene, vinyl acetate, vinyl benzoate, methyl methacrylate, vinylpyrrolidone, acrylic acid, acrylonitrile and acrylamide.

7. The process of claim 1 wherein said photosensitive composition contains a solvent for said vinyl monomer, said photo-oxidant, said catalyst and said silver compound.

8. The process of claim 1 wherein said photosensitive composition is stored at a temperature less than about room temperature and at a pH greater than about 8 prior to said irradiating step.

9. The process of claim 1 wherein the vinyl monomer consists in whole of a polymerizable agent selected from the group consisting of
  (1) alkylenebisacylamides and their derivatives having the general formula:

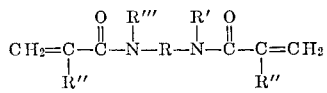

(2) secondary acrylamides or derivatives thereof having the general formula:

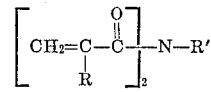

(3) tertiary acrylamides or derivatives thereof having the general formula:

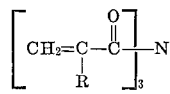

(4) and the divalent or trivalent metal salts of acrylic acid or its derivatives having the general formula:

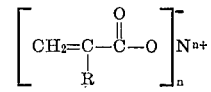

where $n$ is greater than one and M may be calcium, barium, strontium, magnesium, zinc, or aluminum, whereas R, R', and R'' may be H, OR''', alkyl, aryl, alkaryl, arylalkyl, and mixtures thereof, with R''' the same, the alkyl being an aliphatic of 1 to 4 carbon atoms and the aryl an aromatic ring compound of at least 6 carbon atoms.

10. The process of claim 1 wherein the vinyl monomer consists in part of a polymerizable agent selected from the group consisting of
  (1) alkylenebisacylamides and their derivatives having the general formula:

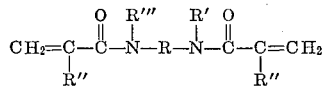

(2) secondary acrylamides or derivatives thereof having the general formula:

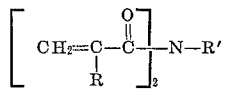

(3) tertiary acrylamides or derivatives thereof having the general formula:

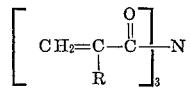

(4) and the divalent or trivalent metal salts of acrylic acid or its derivatives having the general formula:

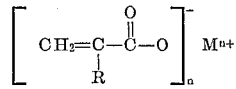

where $n$ is greater than one and M may be calcium, barium, strontium, magnesium, zinc, or aluminum, whereas R, R', and R'' may be H, OR''', alkyl, aryl, alkaryl, arylalkyl, and mixtures thereof, with R''' the same, the alkyl being an aliphatic of 1 to 4 carbon atoms and the aryl an aromatic ring compound of at least 6 carbon atoms.

11. A process for desensitizing a catalyst system for polymerizing a photosensitive composition, which includes the steps of:
  irradiating a said photosensitive composition comprising
    (a) an addition photopolymerizable, ethylenic unsaturated compound in a photopolymerizable system containing relatively smaller amounts of
    (b) an organic photo-oxidant inactive in the absence of light but capable of being raised to a photoactive level when irradiated with visible light having wavelengths lying between about 3800 A. and about 7200 A.,
    (c) an organic sulfinic catalyst capable of releasing an electron to said photo-oxidant when at said photoactive level to produce free radicals capable of initiating polymerization of said vinyl monomer, and
(d) a relatively inactive photo-oxidant and catalyst reaction inhibiting soluble silver compound selected from the group consisting of soluble silver nitrate, soluble silver acetate, soluble silver benzoate, and soluble silver iodide complex,
with image producing light having wavelengths lying in the region between about 3800 A. and about 7200 A.; and
heating said photosensitive composition to activate said silver compound and stop reaction between said photosensitive photo-oxidant and catalyst upon further irradiation with light having wavelengths lying between about 3800 A. and about 7200 A., the pH of said photosensitive composition during at least a portion of said heating being less than about 8.

12. The process of claim 11 consisting of a method of photo-imaging a photosensitive composition applied as a coating on the surface of a support, said coating comprising:
(a) an addition polymerizable, ethylenically unsaturated compound being capable of forming a high polymer by free-radical initiated chain-propagating addition polymerization;
(b) a free-radical generating addition polymerization initiator combination activatable by radiation having wavelengths lying between about 3800 A. and about 7200 A. comprising a light absorptive organic photo-oxidant compound capable of being raised to a photoactive level in said light range and an organic sulfinic compound catalyst, said compound catalyst characterized by being capable of reacting with the light-activated form of said light absorptive compound to generate said free radical initiator;
(c) a relatively inactive silver compound soluble in said light-sensitive composition being capable of accelerating desensitization reaction caused by heat;
(d) a pH adjusted to a value below about pH=7;
imagewise exposing said coated surface to visible radiation having wavelengths lying between about 3800 A. and about 7200 A.;
subjecting said exposed surface coating to temperature between about 20° C. and about 100° C. for sufficient time to cause said coating to become substantially insensitive to visible light having wavelengths lying between about 3800 A. and about 7200 A.

13. The process of claim 11 wherein said organic sulfinic compound is present in concentrations of at least about $1 \times 10^{-6}$ moles per liter of said photosensitive composition.

14. The process of claim 11 wherein said photo-oxidant is present in a concentration of at least about $10^{-7}$ moles per liter of said photosensitive composition.

15. The process of claim 11 wherein said photopolymerizable unsaturated material is a vinyl monomer selected from the group consisting of: vinylidene chloride, vinyl methyl ether, vinyl butyl ether, vinyl butyrate, styrene, vinyl acetate, vinyl benzoate, methyl methacrylate, vinylpyrrolidone, acrylic acid, acrylonitrile and acrylamide and mixtures of said vinyl monomer materials.

16. The process of claim 11 wherein the concentration of said vinyl monomer is above about $2.5 \times 10^{-3}$ moles per liter of said photosensitive composition.

17. The process of claim 11 wherein said photosensitive composition includes a cross-linking agent.

18. The process of claim 11 wherein said photosensitive composition includes a cross-linking agent selected from the group consisting of: N,N'-alkylene-bisacrylamides, secondary acrylamides, tertiary acrylamides, metal salts of acrylic acid, and metal salts of methacrylic acid.

19. The process of claim 11 wherein said vinyl monomer has a functionality of at least 2.

20. The process of claim 11 wherein said photosensitive composition includes, in addition, thickeners to increase the viscosity of said photosensitive composition.

21. The process of claim 11 wherein said photosensitive composition contains a solvent for said vinyl monomer, said catalyst, said photo-oxidant and said silver compound.

22. The process of claim 21 wherein the solvent is selected from the group consisting of water, methanol, glycerol, ethylene glycol and dioxane.

23. The process of claim 21 wherein during said heating of said photosensitive composition, the temperature thereof is raised substantially above room temperature, but below the boiling point of said solvent.

24. The process of claim 11 wherein said photosensitive composition includes a latent pH lowering reagent dissociating therefrom an acid group to lower the pH of said photosensitive composition below about pH 8 upon the heating of said photosensitive composition.

25. The process of claim 24 wherein said pH lowering reagent is selected from the group consisting of chlorohydrin, 1,3-dichloro-2-propanol, chloroacetic acid and dichloroacetic acid.

26. The process of claim 24 including storing of said photosensitive composition in the absence of light at room temperature and at a pH above about 8 before irradiating said photosensitive composition.

27. The process of claim 24 including the step of storing said photosensitive composition in the absence of light below room temperature and at a pH above about 8 before irradiating said photosensitive composition.

28. The process of claim 11 including, in addition, the step of storing said photosensitive composition in the absence of light at a temperature below about room temperature and at a pH above about pH 8 prior to irradiation.

29. The process of claim 11 wherein said photosensitive composition is maintained at about room temperature during irradiation.

30. The process of claim 11 wherein, during said heating of said photosensitive composition, the temperature thereof is raised substantially above room temperature, but lies below the boiling point temperature of the lowest boiling component in said photosensitive composition, thereby to rapidly desensitize said photosensitive composition.

31. The process of claim 11 wherein the heating of said photosensitive composition commences during irradiation thereof.

32. The process of claim 11 wherein the heating of said photosensitive composition commences after irradiation thereof has been terminated.

33. A process for polymerizing vinyl monomers and desensitizing a catalyst system therefor in a photosensitive composition, which includes the steps of:
irradiating said photosensitive composition comprising
(a) a polymerizable vinyl monomer system containing relatively small amounts of
(b) an organic photo-oxidant inactive in the absence of light but capable of being raised to a photoactive level when irradiated with visible light having wavelengths lying between about 3800 A. and about 7200 A.,
(c) an organic sulfinic catalyst capable of releasing an electron to said photo-oxidant when at said photoactive level to produce free radicals capable of initiating polymerization of said vinyl monomer,
(d) a pH lowering agent, and
(e) a said free radical desensitizing agent comprising an ionizable soluble silver compound contained in said photosensitive composition and capable of being activated to inhibit said reaction of (b) and (c), with light having wavelengths lying in the region between about 3800 A. to about 7200 A.; and heating said photosensitive composition above the temperature of irradiating to activate the said silver compound and desensitize said photo-oxidant and catalyst combination to further irradiation with light having wavelengths lying between about 3800 A. and about 7200 A., the pH of said photosensitive composition during at least a portion of said heating being below a pH of about 8.

34. A process of formation of polymer imaging of a vinyl monomer composition, which includes the steps of: irradiating a reaction medium thereof comprising
    (a) a vinyl monomer system containing relatively small amounts of each of
    (b) an organic photo-oxidant inactive in the absence of light but capable of being raised to a photoactive level when irradiated with visible light having wavelengths lying between about 3800 A. and about 7200 A.,
    (c) an organic sulfinic catalyst capable of releasing an electron to said photo-oxidant when at said photoactive level to produce free radicals capable of initiating polymerization of said vinyl monomer, and
    (d) a said free radical reaction inhibiting, soluble silver compound contained in a soluble state in said photosensitive composition,
with radiation in the pattern of the desired image, said radiation having wavelengths lying in the wavelength region between about 3800 A. and about 7200 A., said reaction medium being maintained at about room temperature at the commencement of irradiation; and heating said reaction medium after a predetermined period of time of irradiation, to thereby activate said silver compound and desensitize said reaction of (b) and (c) to light having wavelengths between about 3800 A. and about 7200 A., said reaction medium having a pH less than about 8 at the commencement of said heating.

35. A process of formation and desensitizing of photopolymer imaging of a vinyl monomer system, which includes the steps of:
initially irradiating a reaction medium comprising
    (a) a vinyl monomer in amounts greater than about $2.5 \times 10^{-3}$ moles per liter of said reaction medium;
    (b) an organic photo-oxidant inactive in the absence of light but capable of being raised to a photoactive level when irradiated with visible light having wavelengths lying between about 3800 A. and about 7200 A., said organic photo-oxidant initially present in said reaction medium in amounts greater than about $1 \times 10^{-7}$ moles per liter of said reaction medium;
    (c) an organic sulfinic catalyst capable of releasing an electron to said photo-oxidant when at said photoactive level to produce free radicals capable of initiating polymerization of said vinyl monomer, said catalyst being present in said reaction medium in amounts greater than about $1 \times 10^{-6}$ moles per liter of said reaction mixture; and
    (d) an ionizable soluble silver compound selected from the group consisting of silver nitrate, silver acetate, silver benzoate, and silver iodide complex contained in said reaction medium, said silver compound being present in said reaction medium in amounts greater than about $1 \times 10^{-4}$ moles per liter of said reaction medium,
with imaging light having wavelengths lying in the region between about 3800 A. and about 7200 A. to thereby initiate polymerization in said reaction medium in the form of said image, said irradiation continuing for a given period of time sufficient to enable a polymer image of a predetermined density to be obtained; and heating said reaction medium to a higher temperature level than said initial irradiation activating level, to thereby activate said silver compound and substantially fix and desensitize said reaction medium to light having wavelengths between about 3800 A. and about 7200 A., said reaction medium having a pH less than about 8 during said heating.

References Cited

UNITED STATES PATENTS

| | | | |
|---|---|---|---|
| 2,835,577 | 5/1958 | Levy | 96—114 XR |
| 2,989,455 | 6/1961 | Neugebauer et al. | 204—158 |
| 3,050,390 | 8/1962 | Levinos et al. | 96—35.1 |
| 3,097,096 | 7/1963 | Oster | 96—35.1 |
| 3,331,761 | 7/1967 | Mao | 204—159.23 |

RONALD H. SMITH, Primary Examiner

U.S. Cl. X.R.

96—35.1, 115; 204—159.23, 159.24

PO-1050
(5/69)

UNITED STATES PATENT OFFICE
CERTIFICATE OF CORRECTION

Patent No. 3,531,281          Dated September 29, 1970

Inventor(s) John B. Rust

It is certified that error appears in the above-identified patent and that said Letters Patent are hereby corrected as shown below:

Col. 1, line 27, "583,649" should be --583,650--.
Col. 4, line 42, "desentizing" should be --desensitizing--;
       line 52, "if" should be --of--.
Col. 5, line 17, after "in" insert --a--.
Col. 11, line 28, "turets" should be --tures--.
Col. 18, line 17, "N" should be --M--;
       line 29, "alkylenebisacylamides" should be
              --alkylenebisacrylamides--.

SIGNED AND
SEALED
DEC 15 1970

(SEAL)
Attest:

Edward M. Fletcher, Jr.
Attesting Officer

WILLIAM E. SCHUYLER, JR.
Commissioner of Patents